May 3, 1938. W. J. HARBAUGH 2,116,263
MULTIPLE PURPOSE WELDING JIG
Filed March 29, 1937 2 Sheets-Sheet 2
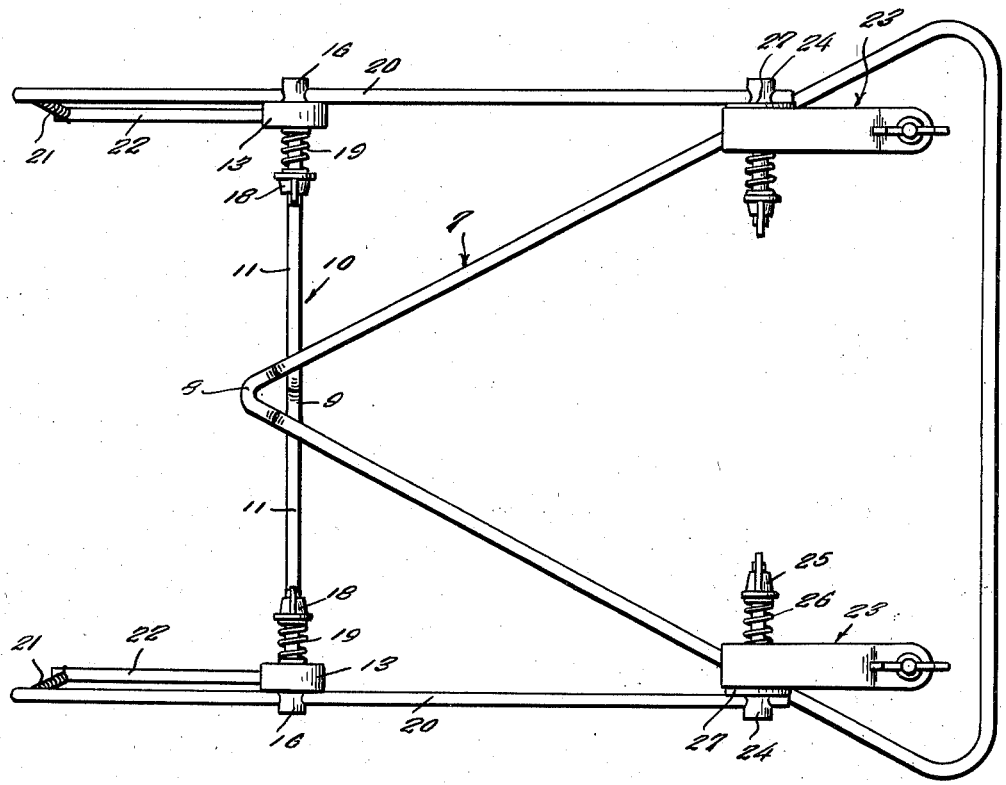
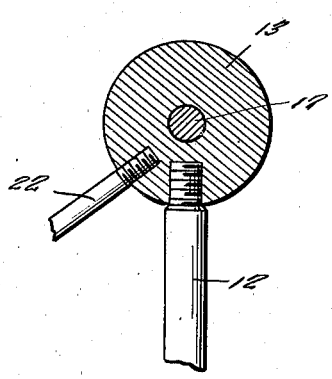
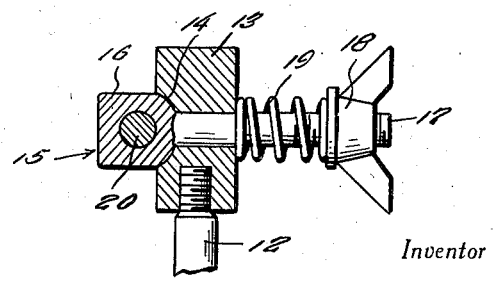
Inventor
W. J. Harbaugh
By Clarence A. O'Brien
Hyman Berman
Attorneys Patented May 3, 1938

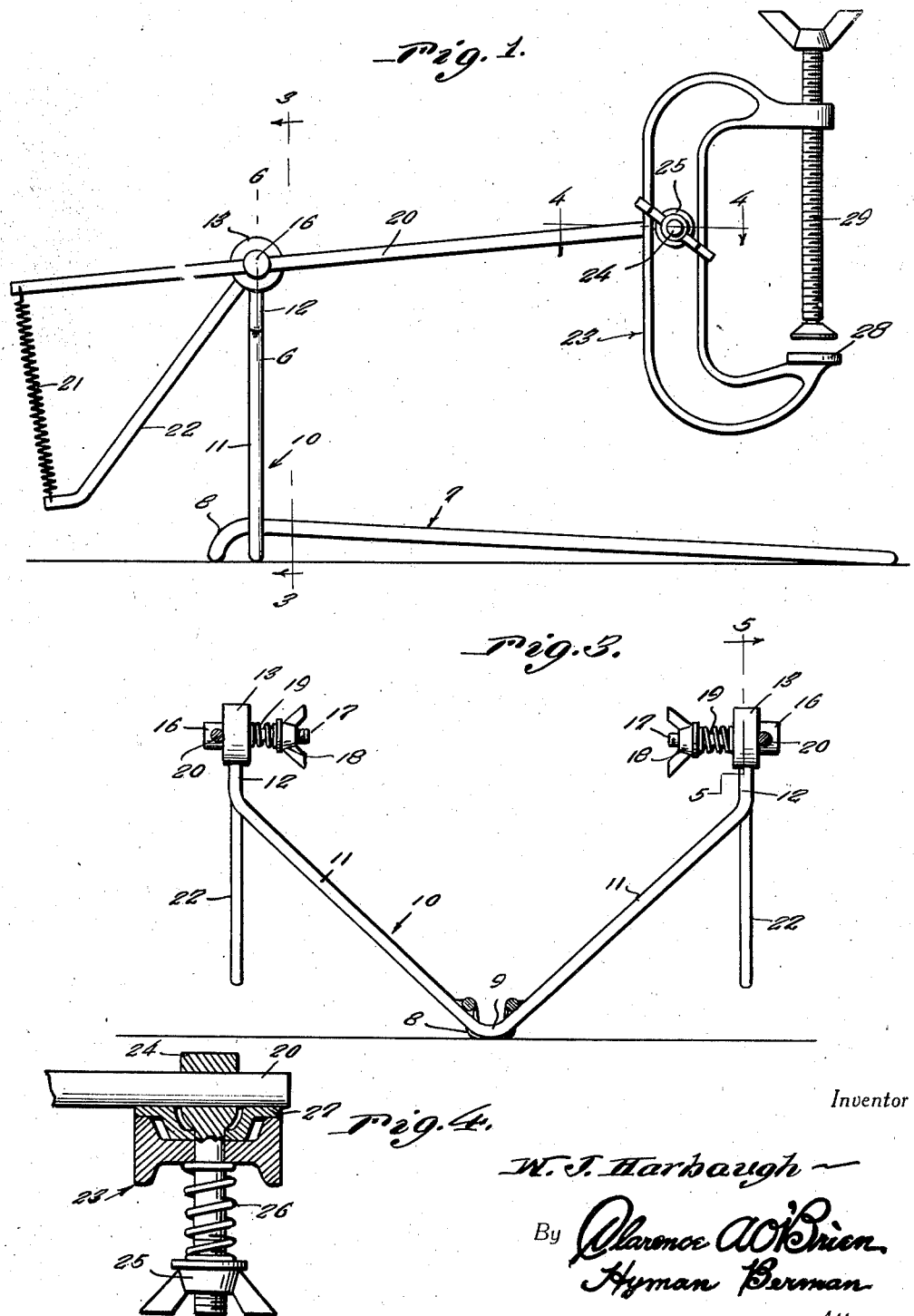

2,116,263

UNITED STATES PATENT OFFICE 2,116,263

MULTIPLE PURPOSE WELDING JIG

William J. Harbaugh, Ashland, Ohio

Application March 29, 1937, Serial No. 133,698

5 Claims. (Cl. 113—99)

The present invention relates to what is believed to be an ingenious mechanical device which may be unitarily referred to as a jig, the same being especially adapted for diversified welding purposes, and so made as to accommodate and hold in place miscellaneous machine elements and parts such as are to be welded or joined together in some equivalent manner.

The principal purpose of the invention is to provide a simple and feasible bench or similar type device expressly constructed to enable the welder to hold together the ends of broken pieces of a predetermined object and to do this at exactly the correct angle and to accomplish the result himself and without the aid of a helper, such as is now frequently desired under present day methods of welding.

In reducing to actual practice the preferred embodiment of the inventive idea, I have perfected a simple, economical assembly characterized by a base or stand and independent pendulous-like suspension arms for adjustable clamps, whereby to permit the associated features to be adjusted in relation to each other to enable the welder to accomplish his task in a reliable and expedient manner.

Needless to say, the outstanding object of the invention is to provide the trade with a well balanced mechanical device equipped with such features and accessories as to properly coordinate and offer their proportionate share to the production of a unitary structure aptly fitted for the purposes intended and calculated to provide an arrangement such as has not been heretofore reduced to practice, so far as I am aware.

Other features and advantages will become more readily apparent from the following description and drawings.

In the drawings:

Figure 1 is a side elevational view of a structure developed and perfected in accordance with the principles of my personal ideas, the same being shown in readiness for use.

Figure 2 is a top plan view of Figure 1.

Figure 3 is a section approximately on the plane of the line 3—3 of Figure 1.

Figure 4 is a section taken on what may be conveniently called the line 4—4 of Figure 1.

Figure 5 is a section of a detail character on the approximate line 5—5 of Figure 3.

Figure 6 is a sectional view on the line 6—6 of Figure 1.

The base or stand is of a two-part type. The base proper is a substantially triangular frame as denoted by the numeral 7, the same being of appropriate dimensions and elevated at its rear end and having its apex portion downturned to form a rest or foot, as at 8. This portion 8 is welded or otherwise connected to the apex portion 9 of the substantially V-shaped yoke or upright 10. The diverging arms 11 terminate in perpendicular portions 12 which in turn terminate in threaded ends to accommodate the removable bearing heads 13. The heads 13 are preferably of ring-like form and the outer surfaces are formed with part-spherical concavities to provide a semi-universal seat for the portion 14 of the special adapter fixture or bolt 15. That is to say, the head 16 of the bolt is formed with the surface 14 fitting into the socket or seat, as depicted in Figure 6. Also, as seen in Figure 6, the threaded end 17 is provided with a wing nut 18 coacting with a tension spring 19 to maintain the parts 15 and 13 in yieldable assembled relationship. Inasmuch as the head 16 is bored, it functions as the bearing for the complemental pendulous arm or rod 20 which is slidable and rotatable therein. This arrangement therefore provides a substantially universal mounting on the upright 12 for the spaced parallel supporting rods or arms 20.

It is to be noted that the rear ends of the arms project beyond the universal support and are connected with coil springs 21 which springs in turn are anchored on depending retention members 22 carried by the heads 13.

The work clamp, which is here shown as a C-shaped unit, is denoted by the numeral 23. There are two of these clamps and they are individually mounted on the respective supporting arms 20. This is accomplished through the use of an eye bolt, the eye of which is denoted by the numeral 24 in Figure 4. The eye is slidable on the arms 20 and the threaded stem thereof carries the tightening nut 25 and coil spring 26, the spring bearing against the I-beam portion of the body of the clamp forcing it into contact with the washer 27, which is interposed between the clamp and the arm 20, as illustrated. This provides a slidable pivotal and adjustable mounting for the clamp 23. Obviously, different types of clamps may be used, and in the present instance the clamp is provided with a work-holding jaw 28 and a set screw 29. The main idea, however, is to provide a mounting on the arm 20 to accommodate a clamp, which mounting is bodily slidable with respect to the longitudinal axis or dimension of said arm and which allows pivotal adjustment of the clamp through a limited arc in a substantially perpendicular line. Further, however, the arm itself is bodily slidable and oscillatory in the bearing means seen in Figure 6. Hence, the respective pairs of arms can be adjusted in relation to each other to properly position the clamps at the most advantageous position to hold the companion portions of the reparable object in such relationship as to enable them to be satisfactorily welded or joined together by the welder.

The gist of the invention resides in the provision of a portable stand preferably characterized by the triangular base 7 and the upstanding yoke, the yoke having universal bearing means on the upright portions thereof to accommodate a clamp adapter arms or rods 20. Specific novelty, however, resides in the particular construction of the bearing means seen in Figure 6, the clamping means seen in Figure 4, and the spring means identified by the numerals 21 and 22, in Figure 1. All of the parts have been carefully chosen and mechanically coordinated to insure that their cumulative force and effect will accomplish the desired results in a feasible and reliable manner.

Broader novelty may reside in the provision of an appropriate support with the pairs of arms 20 partly spring retained in place, said arms being of a pendulous type to permit the individual adjustment as well as the individual adjustment of the clamping means thereon, to accommodate almost any task within reason.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structural assemblage of the class described, work holding means comprising a V-shaped support, a pair of arms slidably mounted intermediate their ends on said support and rockable about a horizontal axis, said arms being disposed in opposed parallelism, individual work engaging clamps on one end of the arms, and adjustable mountings for securing the clamps on said arms, counter-balanced means at the other end of the arms and a base engaging the crotch portion of the support to maintain the same in an upright position.

2. In a work holder to facilitate welding, said holder comprising a portable support, an arm pivotally and slidably mounted intermediate its ends on said support, a work retaining clamp, an adjustable adapter device for pivotally and slidably mounting the clamp on one free outer end portion of said arm, spring means engaging the opposite end of the arm yieldably maintaining the clamp in elevated position and a base for the support extending from one side thereof and underlying the clamp supported end of the arm.

3. In a work holder of the class described, a stand including a base frame having diverging portions, a vertical V-shaped support engaged at its crotch portion to one end of the first-named frame and rising perpendicularly therefrom, individual bearings carried by said vertical frame, a pair of arms mounted in respective bearings, said arms being individually adjustable, work clamps, and devices for adjustably attaching the clamps to said arms.

4. A work holder of the class described comprising a stand including a triangular base member, a V-shaped support attached at its crotch portion to one corner of and rising from said base member, said upright having adjustable bearing heads, a substantially horizontally disposed arm slidably and adjustably associated with each head, spring balancing means for the inner end of each arm, a pair of C-shaped clamps, and adapter mountings for adjustably connecting the clamps on the respective arms.

5. In a structure of the class described, a support including a horizontally disposed triangular base frame, a V-shaped upright frame attached to the apex end of said triangular frame, said V-shaped frame being vertically disposed and the diverging arms thereof terminating in perpendicular portions, bearing units detachably connected to the perpendicular portions, each bearing unit including a ring-like member, and an eye-bolt spring pressed and associated therewith, the eye-bolt being adapted to accommodate a work suspension arm.

WILLIAM J. HARBAUGH.